United States Patent
Raymond

[15] 3,703,959
[45] Nov. 28, 1972

[54] DISPOSABLE RECIRCULATING DIALYSATE MODULE

[72] Inventor: Julius R. Raymond, Northridge, Calif.

[73] Assignee: CCI Aerospace Corporation, Van Nuys, Calif.

[22] Filed: Nov. 17, 1969

[21] Appl. No.: 877,090

[52] U.S. Cl. ..................210/87, 210/95, 210/321
[51] Int. Cl. ..............................................B01d 31/00
[58] Field of Search..........210/85, 94, 95, 87, 22, 23, 210/321, 177, 257, 258, 259

[56] References Cited

UNITED STATES PATENTS

| | | | |
|---|---|---|---|
| 2,720,879 | 10/1955 | Gasca et al. ............210/321 X |
| 2,969,150 | 1/1961 | Broman.....................210/321 |
| 3,506,126 | 4/1970 | Serfass et al................210/96 |
| 3,457,944 | 7/1969 | Cary et al. .............210/321 X |
| 3,515,275 | 6/1970 | Bowman.....................210/22 |
| 3,416,664 | 12/1968 | Kumme et al. .............210/87 |

*Primary Examiner*—Frank A. Spear, Jr.
*Attorney*—Robert E. Geauque

[57] ABSTRACT

A disposable module containing all equipment, instruments and material required to circulate and treat the dialysate solution during the treatment of the patient. The module is of inexpensive construction so that it can be thrown away after a single treatment. When the artificial kidney membrane is separate from the module, two lines connect the module to the artificial kidney membrane and when the artificial kidney membrane is contained in the module, two lines connect the module directly to the patient. The module contains separate compartments for the chemicals which treat the dialysate solution and has separate compartments which serve as a reservoir and as a container for a reconstitution fluid. All passages are formed integral with the module and all instruments are of simple, cheap construction which can be disposed of with the module.

10 Claims, 8 Drawing Figures

JULIUS R. RAYMOND
INVENTOR.

BY R.E. Geangue
ATTORNEY

PATENTED NOV 28 1972 3,703,959
SHEET 2 OF 2
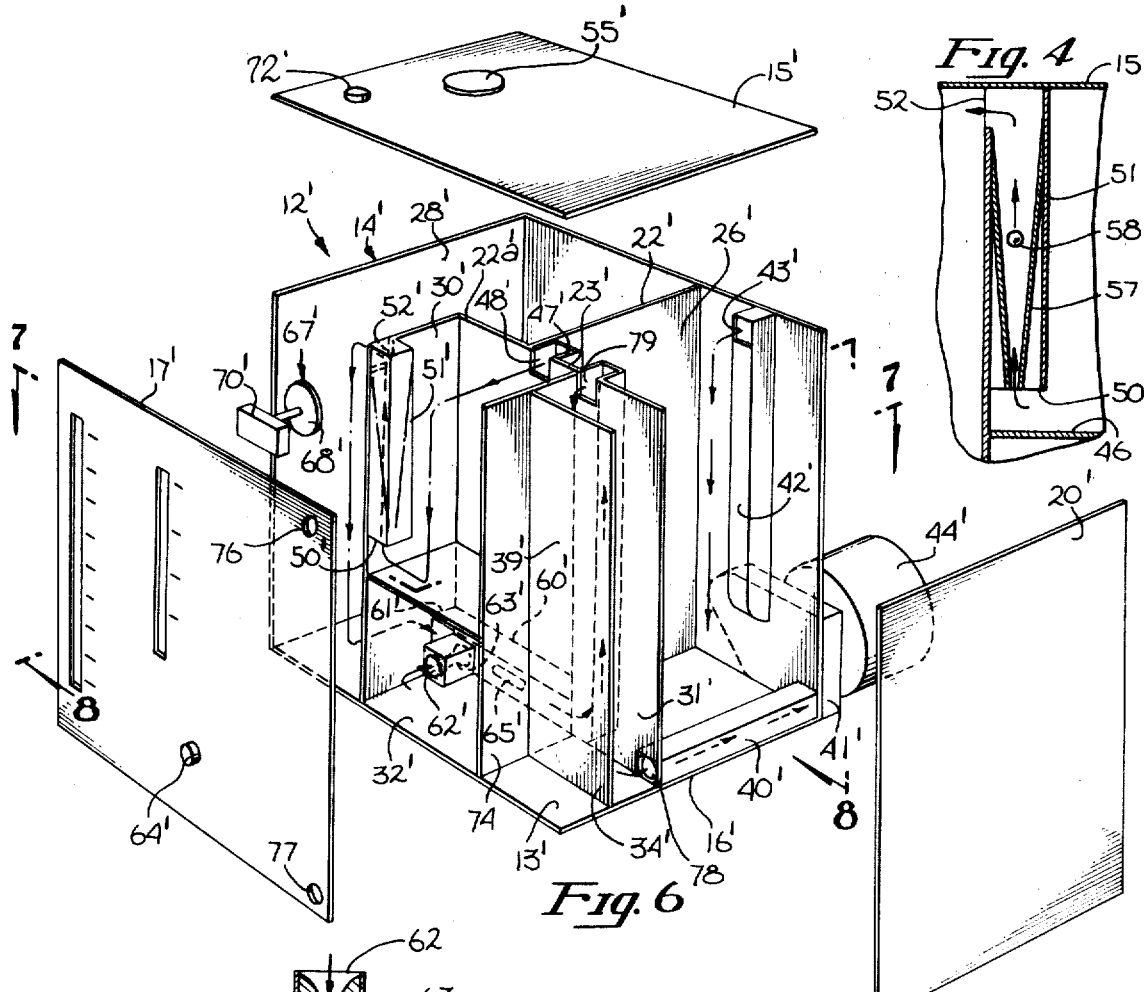
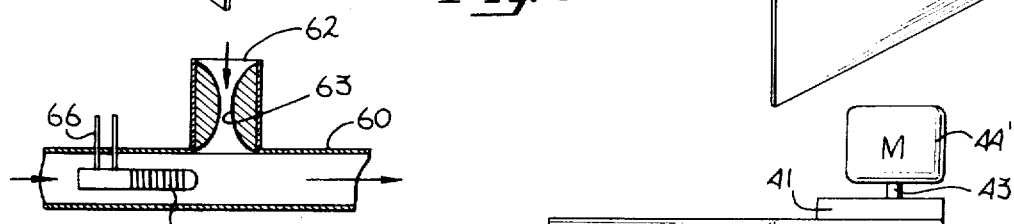
Fig. 5
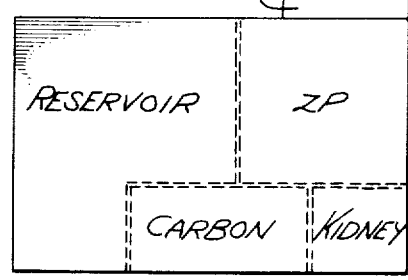
Fig. 7
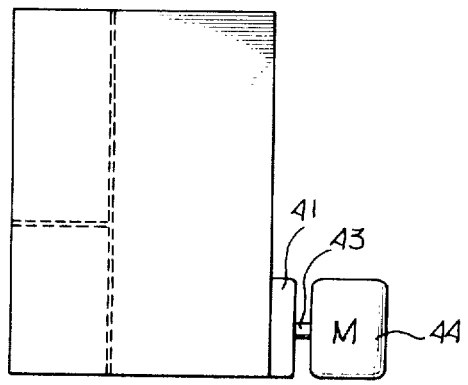
Fig. 8
JULIUS R. RAYMOND
INVENTOR.
BY R. E. Granger
ATTORNEY 3,703,959

DISPOSABLE RECIRCULATING DIALYSATE MODULE

BACKGROUND OF THE INVENTION

A recirculating dialysate system for use with an artificial kidney is disclosed in pending U. S. application Ser. No. 92,864 filed Nov. 25, 1970, streamlined application of U. S. application Ser. No. 837,714, filed June 30, 1969, and assigned to the same assignee. The various components of this system are connected together by well known types of tubing and fasteners which must be detached when the components are sterilized or refilled or replaced for further use. For instance, the column containing the urease and zirconium phosphate must be refilled or replaced after the effectiveness of the material terminates and the same is true of the column containing the activated carbon and hydrated zirconium oxide. Also, the reservoir of the dialysate solution and the reservoir for the reconstitution solution must be sterile prior to commencement of each treatment. Finally, all valves and meters must also be sterilized if there is any possibility of contact with used dialysate solution. Obviously, a reusable recirculating dialysate system is expensive to manufacture and time consuming in its use.

SUMMARY OF THE INVENTION

The disposable recirculating dialysate module of the present invention minimizes or eliminates a multiplicity of connections and components required in reusable recirculating dialysate systems and thereby effects substantial reduction in costs of the equipment and of use and maintenance. In one form, the invention comprises a module which is easily connected with a separate artificial kidney. In another form of the invention, the artificial kidney dialyzing membrane is integrally incorporated in the module so that all connections and passages washed and traversed by the recirculating dialysate fluid are permanently hermetically sealed and need not be broken to prepare for use, to use, or to disengage from the patient following use. In both forms of the module, the substances used in the treatment of the dialysate solution are self-contained and the cost of the module and contained substances is such that they may be discarded and disposed of following a patient treatment.

The module can comprise a plastic container in which the elements are integrally connected and inseparable, and cooperate with each other to achieve the circulation, filtering and chemical treatment of the dialysate fluid. A single, unitized, compartmented container contains all of the chemicals, fluids, chambers, reservoirs, cavities, passages, fluid pumps, gages, valves and connections needed to properly circulate and treat a dialysate fluid between the outlet and inlet of an artificial kidney. Also, as previously stated, the container can fully enclose and encase an artificial kidney dialyzing membrane. Provision can be made for obtaining a plurality of different flow rates of the dialysate solution and for obtaining infusion of reconstitution fluid into the solution in different amounts.

It is therefore an object of the invention to provide a disposable recirculating dialysate module containing all equipment and material required to circulate and treat a dialysate solution and being of inexpensive construction so that the module can be disposed of after a single treatment.

Another object of the invention is to provide a disposable recirculating dialysate module which fully encloses and encases an artificial kidney dialyzing membrane.

BRIEF DESCRIPTION OF THE DRAWINGS

FIG. 4 is an expanded sectional view of the flow measuring device in the discharge passage from the dialysate reservoir.

FIG. 5 is an expanded sectional view of the infusion passage and showing the heating element.

FIG. 6 is an expanded schematic prospective of a form of the disposable module containing a fully enclosed artificial kidney dialyzing membrane.

FIG. 7 is a horizontal section along line 7—7 of FIG. 6.

FIG. 8 is a vertical section along line 8—8 of FIG. 7.

DESCRIPTION OF THE PREFERRED EMBODIMENTS

Figure 1:
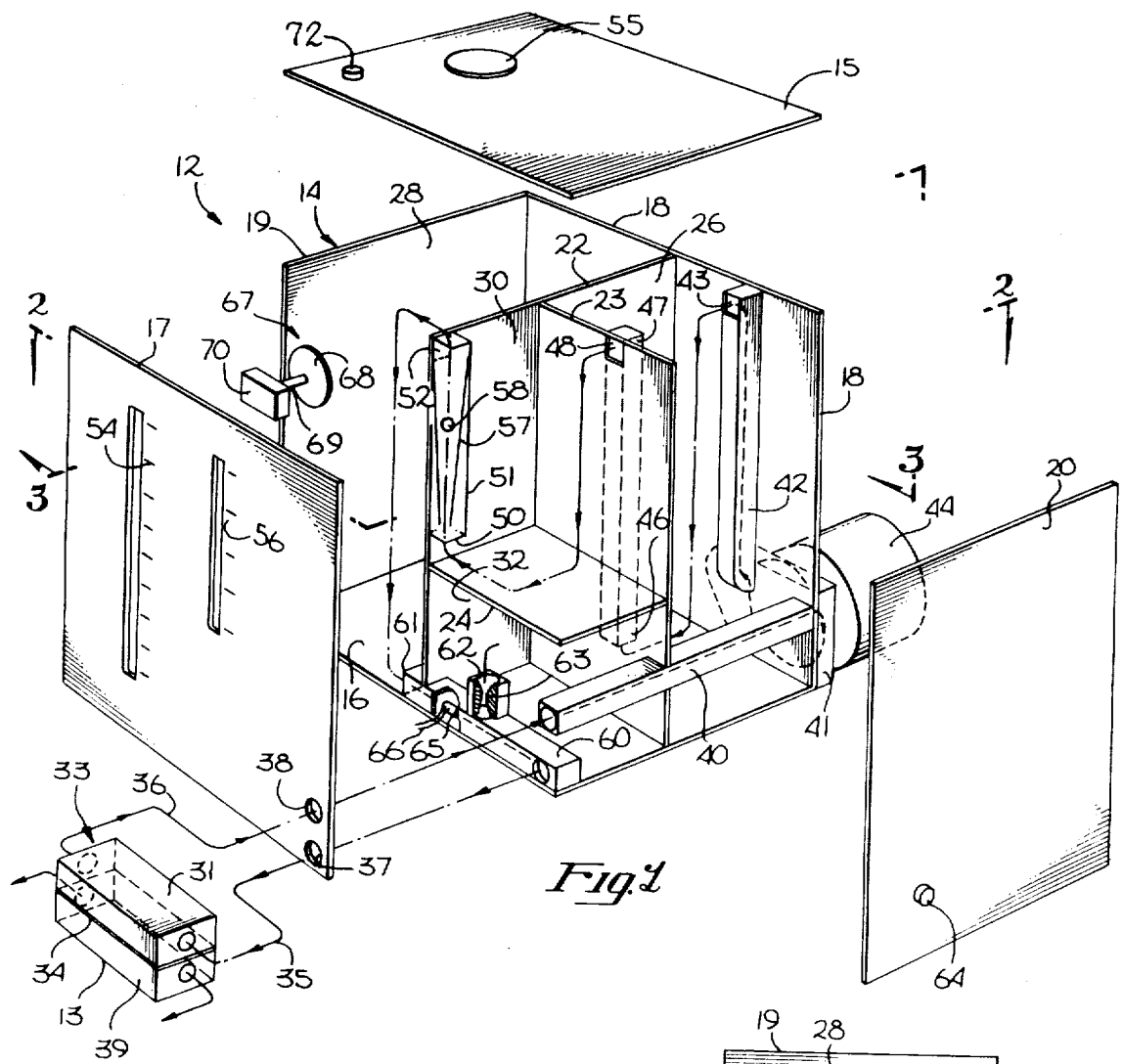
FIG. 1 is an expanded schematic prospective of the disposable module illustrating the component of the treatment system.
Figure 3:
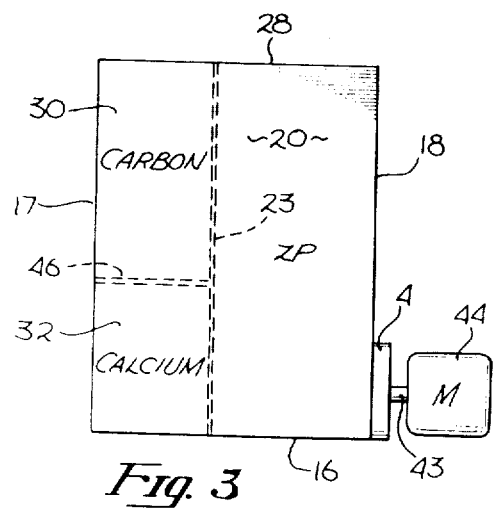
FIG. 3 is a vertical section along line 3—3 of FIG. 1.
Figure 2:
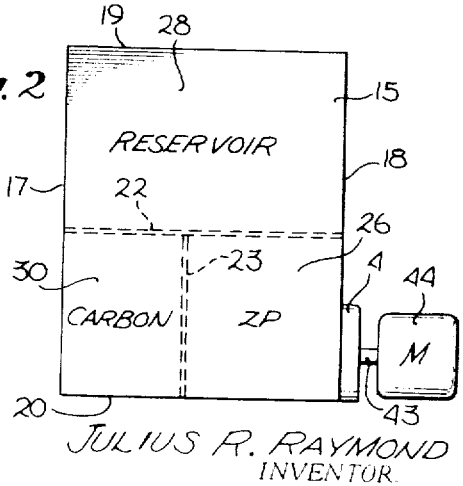
FIG. 2 is a horizontal section along line 2—2 of FIG. 1.

Referring to FIG. 1, the disposable module 12 comprises a transparent plastic container 14 which can be molded in sections and the sections then connected together along section lines. The container 14 has top and bottom panels 15 and 16, front and back panels 17 and 18, and side panels 19 and 20 which enclose the interior of the container. Also, two vertical partitions 22 and 23 and a horizontal partition 24 divide the interior of the container into compartments 26, 28, 30 and 32. A separate small artificial kidney 33 of well known construction contains a dialysating membrane 34, and lines 35 and 36 connect one side 31 of the membrane to openings 37 and 38, respectively, in front panel 17. It is understood that the opposite side 39 of the membrane is connected by suitable means to the patient to receive blood from the patient.

Opening 38 connects with integrally molded passage 40 which passes through compartments 32 and 26 and terminates at the dialysate pump housing 41. The pump within housing 41 can be of the type comprising a curved flexible tubing (not shown) which connects passage 40 to an outlet passage 42 and is successively squeezed by the blades of an impeller which is located within the housing and driven by shaft 43 of a small electric motor 44. Several different sizes of pump tubes are available and the flow rate for a particular modular will be determined by the size of tube placed within housing 41 prior to assembly of the housing, considering that the speed of motor 44 is constant. The drive of the impeller from the motor shaft can be by means of a magnetic clutch or other mechanism available for transmitting motion through the wall of pump 41.

The fluid in passage 42 flows up to the top outlet opening 43 of the passage and then into the top of compartment 26. The compartment 26 can contain a layer of urease and a layer of zirconium phosphate separated by a layer of diatomaceous earth. The dialysate fluid filters downward through compartment 26 and into the bottom outlet opening 46 of passage 47 which is integrally molded with partition 23. In the compartment 26, substantially all the urea in the dialysate solution is converted by the urease into ammonia carbonate, and the layer of diatomaceous earth takes out the colloidal and particle matter. In flowing through the zirconium phosphate, the ammonium ion is picked up and is replaced by sodium and hydrogen so that the ammonium concentration of the fluid in passage 47 is substantially zero.

The fluid flows upward in passage 47 and enters the top of compartment 30 through outlet 48. The compartment 30 can contain a layer of activated carbon over a layer of hydrated zirconium oxide. The activated carbon picks up uric acid and creatinine, as well as other organic waste and the zirconium oxide picks up phosphate and sulphate from the solution. The fluid filters downward through compartment 30 and enters lower opening 50 of passage 51 which is integrally molded with partition 22.

Top opening 52 of passage 50 directs the fluid to enter the top of compartment 28 which serves as the dialysate fluid reservoir. Panel 17 has a gauge 56 marked thereon opposite the conical interior surface 57 of passage 51. The transparent passage contains a weighted ball 58 which moves upwardly in the passage as the flow rate increases and the location in the ball opposite scale 56 is a measure of the flow rate in the dialysate system. Transparent front panel 17 contains gauge markings 54 thereon opposite the compartment 28, by which the volume of fluid in the reservoir compartment may be determined at any time, either before or during treatment of the patient.

The reservoir compartment acts as an accumulator for increase of fluid inventory during use and operation of the module. Suitable means are employed to relieve the tendency toward an increase (or decrease) in pressure within the reservoir resulting from an increase (or decrease) in fluid inventory elsewhere in the system. Such suitable means for pressure relief comprises a hydropholic filter plug 55 in the top panel 15 which lets air, but not liquid, in and out of compartment 26. Such a plug is well known and is formed of porous stainless steel covered with teflon. Infinite relief is not provided nor is it desirable. The nature of hemodialysis is such that only limited amounts of water should be extracted from the patient. Therefore, the compartment reservoir is constructed to relieve pressure build-up while accommodating a preset liquid take-up, following which there would be no pressure relief. Thus, when the compartment becomes full after taking up the preset amount of water from the patient, the build-up in pressure of the dialysate solution will prevent further water removal from the patient. Therefore, this allowance for a preset, specific volume increase performs a natural control function without moving parts or operator attention.

A passage 60 has an inlet opening 61 located at the bottom of reservoir 28 and passage 60 leads through compartment 33 to opening 37 in the front panel, which returns the dialysate fluid to the artificial kidney through line 35. A branch passage 62 connects the interior of compartment 32 with passage 60 and contains an orifice 63 to withdraw from compartment 32 a precisely metered portion of a liquid chemical by ejector action and inject or infuse the chemical into the dialysate fluid flowing in passage 60. The liquid chemical solution is a dialysate reconstitution solution of substances such as magnesium and calcium salts, which are removed by the zirconium phosphate and therefore must be returned to the dialysate solution before it again enters the artificial kidney. The patient would be depleted of these substances if it were not for the continual addition of these substances to the dialysate solution.

A small electrical heater 65 is located in passage 60 and has leads 66 molded in the plastic wall 17 and extending outside to connect with an electrical source (not shown). The heater keeps the temperature of the dialysate solution up to normal body temperature and can be under the control of a suitable thermocouple (not shown) located in the fluid passage at a desired location. The pressure of dialysate fluid within the module can be continually measured by gauge 67 which consists of a very thin section 68 in panel 17 to which is connected an arm 69 of a pressure reading device 70. As the pressure in compartment 28 increases, the section 68 bulges outward to move arm 69 and produce an indication of greater pressure. Since the rate of passage of water through the membrane 34 is controlled almost entirely by the pressure gradient across the membrane, and since the pressure must not drop low enough to cause rupture of the membrane, it is advisable to monitor the pressure within the system. As the water is taken out of the blood by the artificial kidney, it is added to the closed dialysate system and shows up as an addition to the system at the gauge 54. A break in the kidney membrane cannot remove more blood from the patient than will fill the remaining space in the reservoir and this amount of blood removal will not be enough to kill the patient. In addition to the removal of water, other impurities in the blood, such as urea, creatinine, uric acid and other unknown toxic materials, must also be removed and these are removed at a rate controlled by the dialysate flow rate.

The disposable module 14 as initially supplied to the patient is equipped with a sealed pump impeller and tube which will produce the flow rate required by the patient's condition. Also, filler plugs 72 and 64 can be located in the outside wall of compartments 28 and 32, respectively, so that the dialysate solution and reconstitution fluid can be added just before use of the system. The materials in compartments 26 and 30 are added in loose granule form, prior to closing of the module. After addition of the liquids, the complete system including the artificial kidney will fill with dialysate fluid and the pump 41 will then be ready to circulate the fluid. Plugs are used to seal the openings 37 and 38 until the passages 35 and 36 are inserted therein just before the solutions are added to the module. The chemical composition of the reconstitution solution added to chamber 32 can be adjusted to the patient's condition before being placed in the module. After the module is connected to the artificial kidney, the motor 44 is started to drive pump 41 and the electrical source is connected to the heater 65. When the motor is started, the treatment commences and continues for the selected treatment time. When the treatment is completed, the module is disconnected from the lines 35 and 36 and the plugs reinserted in openings 37 and 38. The motor shaft 43 and the heater electrical source are also disconnected and the module is then ready to be thrown away. Since the artificial kidney 13 is separate from the module, it can be used several times before being disposed of.

The disposable module and solutions are supplied to the patient in sterile condition and no sterilization of the module is required before use. After use, no sterilization is required since the module is simply thrown away. Thus, considerable time is saved through the use of the disposable module. In the prior type of systems which utilizes permanent containers for the chemicals and solutions, it would be necessary for the patient to presterilize the complete system before use and after the treatment, it would be necessary to remove the chemicals and liquid from the equipment and dispose of them. While the granular materials could be packaged in cartridges, it is still necessary for the patient to remove the cartridge and become exposed to the toxic substances removed from the blood. Therefore, special equipment should be used for the removal of used materials and such equipment is not available to the patient in his home.

Thus, the present invention makes available a device which can be quickly and easily set up and used by the patient in his home and easily disposed of by the patient. When the module is constructed of a transparent plastic, the patient is able to observe the flow of the dialysate solution throughout the device and is able to observe from the flow meter when the fluid is flowing at a proper rate. Also, the patient is able to monitor the pressure of the dialysate solution during treatment. Under normal operation, it is not necessary for the patient to adjust the flow rate or to make any other adjustments to the module since the module is designed for the particular patient's condition. The container has the ability to accommodate changes in the quantity of circulating fluid resulting from filtering across the dialyzing membrane, without connections to a drain or supply line and without impairing the sanitary state of the fluid. The original amount of dialysate solution added to the module is such as to permit addition of water to the solution during the treatment. The means for measuring pressure and flow rate are integrally and permanently connected and molded into the container so as to avoid fluid connections when engaging and disengaging the module with the artificial kidney. Also, the electrical resistance heating element is permanently inserted and integrally molded into the container to heat the dialysate fluid to any desired temperature and the thermostatic control (preferably thermocouples) is similarly molded into the container for the purpose of maintaining selected temperature for extended periods of time. The dialysate module can be inserted or plugged into a specially designed power module which provides motive power for the pump and electrical power for the heater and any other electrical instruments. The disposable module may also house other instruments which serve to monitor the dialysate module performance, the dialysate condition, or any other conditions of the patient or his environment.

In the form of the invention shown in FIGS. 6–8, the parts similar to those of the prior embodiment are designed by like primed reference numerals. The module 12' differs from the prior embodiment in that the partition 22' has a step portion 22a' connecting with partition 23'. Also, a vertical partition 74 extends between partitions 23' and front 17' to form compartments 30' and 32' on one side and to form an artificial kidney membrane compartment 13' on the opposite side. A membrane 34' is positioned vertically in compartment 13' and divides the compartment into spaces 31' and 39'. The front panel 17' contains openings 76 and 77 which connect the lines leading from the patient with opposite ends of space 39' so that the blood will circulate in space 39'.

The dialysate fluid leaves the bottom of space 31' through opening 78 at the entrance to passage 40' and the passage connects with pump 41' which discharges to vertical passage 42'. The top end of passage 42' discharges through opening 43' into compartment 26' which contains the same substances as compartment 26. The fluid then enters passage 47' through bottom opening 46' and is discharged into the top of compartment 30' through opening 48'. The fluid filters down through the material in compartment 30' which is the same as in compartment 30 and enters bottom opening 50' of passage 51'. Top opening 52' of passage 51' discharges the fluid into reservoir compartment 28' and the fluid leaves through opening 61' of passage 60'. The fluid in passage 60' is returned to space 31' through top opening 79. Branch passage 62' contains a metering orifice 63' for adding reconstitution solution to the dialysate fluid.

In utilizing this form of the invention, the chemicals in compartments 30' and 32' can be loaded in the module 12' and the module sterilized before it is delivered to the patient. Also, openings 76 and 77 can be initially closed by suitable plugs. Before use of the module, the dialysate solution can be added to reservoir compartment 28' through opening 72' and the reconstitution solution can be added to compartment 32' through plug opening 64'. As illustrated, the passage 60' contains a heater 65' and pressure transducer 67' is located in the wall of reservoir 28', both for the same purpose as in the prior embodiment.

During the treatment, motor 44' drives pump 41' to circulate the fluid through chamber 31' and past the membrane 34'. At the same time, blood flows past the opposite side of the membrane so that undesirable substances can be removed from the blood. In this embodiment, all the dialysate lines are permanently sealed and closed and are never connected or disconnected. It is understood that the artificial kidney chamber 13' can contain a membrane of any suitable configuration, such as a flat sheet or sheets, a convolated sheet or sheets, or a multitude of separate tubes properly manifolded. In the illustrated membrane structure, the compartment 13' could be fabricated as a separate box which could be plugged into the side walls of partition 23' and 74. After use, the complete modified module 12' is thrown away including the artificial kidney structure.

The disposable module can be fabricated of other material than plastic and various types of flow meters, pressure gauges, heaters, etc., can be formed integral with the container and disposed of with the container. Any range of pump outputs can be available for attachment to the motor and any suitable chemicals, other than those disclosed herein, can be placed in the various compartments for treating the dialysate solution. Also, the number of compartments formed in the module can vary if so desired.

What is claimed is:

1. A disposable dialysate module for recirculating dialysate solution comprising:
   a single closed container for said dialysate solution defined by integrally formed walls,
   said container comprising a plurality of partitions each integrally connected along at least one edge to said container for forming a plurality of separate compartments located on opposite sides of said partitions,
   passage means for said dialysate solution formed integrally with said container for circulating said solution through at least some of said compartments,
   said passage means introducing said solution at the top of each of said solution circulating compartments and withdrawing the fluid at the bottom so that dialysate solution flows downwardly through all said fluid circulating compartments, and
   pump means integral with said passage means for circulating said solution, said pump means having a power input connectable thereto from the exterior of said container.

2. A disposable module as defined in claim 1 wherein said container has only two openings to the exterior thereof during the patient treatment for receiving two external passages.

3. A dialysate module as defined in claim 2 wherein one of said compartments contains an artificial kidney membrane means,
   said passage means circulating the dialysate solution on one side of said membrane means;
   said two external passages connecting to the patient in order to circulate blood past the other side of the membrane.

4. A disposable module as defined in claim 1 wherein said passage means comprises a passage along an external wall of said container, said wall being transparent to observe the interior of said passage,
   said passage containing a movable indicator therein, the position of which is a measure of the flow rate of the dialysate solution through said system.

5. A disposable module as defined in claim 1 wherein one of said compartments is larger than the other compartments and comprises a reservoir for the dialysate solution, said reservoir being larger in capacity than required to hold the initial charge of dialysate so that water removed from the patient during dialysis treatment can be added to the dialysate solution.

6. A disposable module as defined in claim 5 wherein a wall of said reservoir is transparent to permit observation of the dialysate solution within said reservoir compartment; and calibrations on said wall to determine the volume of said solution in said reservoir at any time during the treatment.

7. A disposable module as defined in claim 1 wherein one of said compartments contains a reconstitution fluid,
   said passage means comprising a passage extending through said reconstitution compartment, and means for introducing said reconstitution solution into said passage at a predetermined rate.

8. A disposable module as defined in claim 1 wherein one of said compartments is a reservoir for the dialysate solution and another of said compartments contains a solution for reconstituting the dialysate fluid,
   the exterior wall portions of said compartments containing plugged openings for introducing dialysate fluid and reconstitution solution, respectively, into said compartments prior to the use of the module in treatment of the patient.

9. A module for recirculating dialysate solution comprising:
   a fluid tight container for confining a charge of said dialysate solution,
   a plurality of partitions in said container for dividing said container into a plurality of compartments located on opposite sides of said partitions,
   passage means for connecting a plurality of said compartments in series for circulating dialysate fluid successively through said plurality of said compartments,
   said passage means having an inlet and an outlet for each of said fluid circulating compartments, said inlet being at the top and said outlet being at the bottom of each circulating compartment so that the dialysate solution flows downwardly through each compartment,
   said passage means comprising a passage section extending completely through one of said compartments and having an opening in said section for receiving fluid from said one compartment.

10. A system as defined in claim 9 wherein:
    said fluid circulating compartments comprise a reservoir compartment for receiving an initial charge of dialysate solution, said reservoir being of greater volume than said charge so that the additional fluid added to the solution during dialysis can be measured, and two separate dialysate treatment compartments for removing impurities from said dialysate solution.

* * * * *